(12) United States Patent
Kimura

(10) Patent No.: US 8,634,015 B2
(45) Date of Patent: Jan. 21, 2014

(54) IMAGE CAPTURING APPARATUS AND METHOD AND PROGRAM FOR CONTROLLING SAME

(75) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 13/057,923

(22) PCT Filed: Oct. 2, 2009

(86) PCT No.: PCT/JP2009/067584
§ 371 (c)(1),
(2), (4) Date: Feb. 7, 2011

(87) PCT Pub. No.: WO2010/041721
PCT Pub. Date: Apr. 15, 2010

(65) Prior Publication Data
US 2011/0134310 A1    Jun. 9, 2011

(30) Foreign Application Priority Data
Oct. 10, 2008 (JP) ................................ 2008-264628

(51) Int. Cl.
*G02B 13/16* (2006.01)
*H04N 5/225* (2006.01)

(52) U.S. Cl.
USPC ........... 348/335; 348/340; 348/345; 348/348; 348/350; 348/352

(58) Field of Classification Search
USPC ................. 348/335, 340, 345, 348, 349, 356; 396/111, 121
See application file for complete search history.

(56) References Cited

U.S. PATENT DOCUMENTS

| | | | | |
|---|---|---|---|---|
| 4,626,674 A | * | 12/1986 | Oinoue | 250/201.8 |
| 5,614,985 A | | 3/1997 | Odaka | |
| 2008/0277566 A1 | * | 11/2008 | Utagawa | 250/208.1 |
| 2011/0096171 A1 | | 4/2011 | Kimura | |

FOREIGN PATENT DOCUMENTS

| | | |
|---|---|---|
| JP | 5011178 | 1/1993 |
| JP | 6138378 | 5/1994 |
| JP | 2000-258682 | 9/2000 |
| JP | 2002-258142 | 9/2002 |
| JP | 2006-145862 | 6/2006 |
| JP | 2006-178076 | 7/2006 |
| JP | 2007-127746 | 5/2007 |
| JP | 2007-317951 | 12/2007 |
| JP | 2007-333801 | 12/2007 |
| JP | 2008-103885 | 5/2008 |

* cited by examiner

*Primary Examiner* — Yogesh Aggarwal
(74) *Attorney, Agent, or Firm* — Fitzpatrick, Cella, Harper & Scinto

(57) ABSTRACT

An image capturing apparatus includes an image sensor provided in the neighborhood of an image plane of a photographing optical system for forming the image of a subject; pupil dividing member for forming images of a pair of light beams that have passed through different pupil regions of the photographing optical system; focus detection sensors arranged two-dimensionally for photoelectrically converting images of the pupil dividing member; and a correlation calculation unit which, in order to obtain one focus measurement value from one pair of two-dimensional images generated by the focus detection sensors and extending in the pupil dividing direction of the pupil dividing member and in a direction perpendicular to the pupil dividing direction, calculates the correlation between the pair of two-dimensional images while shifting the pair of two-dimensional images in the pupil dividing direction.

8 Claims, 19 Drawing Sheets

FIRST LINE
SECOND LINE
THIRD LINE
FOURTH LINE

▨ : R

▯ : G

▨ : B

A : PIXEL FOR FOCUS DETECTION ; A IMAGE

B : PIXEL FOR FOCUS DETECTION ; B IMAGE

IMAGE CAPTURING APPARATUS AND METHOD AND PROGRAM FOR CONTROLLING SAME

TECHNICAL FIELD

The present invention relates to an image capturing apparatus having an autofocus detection function.

BACKGROUND ART

Improvements in the performance of focus detection systems in recent years have been accompanied by many proposals relating to so-called multi-point focus detection systems of multi-point focusing type in which range finding is possible at multiple points within a viewfinder. In a multi-point detection apparatus that performs multi-point focusing by utilizing the principle of phase-difference autofocusing, use is made of a method that involves acquiring a pair of image signals corresponding to respective focus-measurement points, performing a correlation computation and computing a defocus amount from the phase difference between the signals.

The specification of Japanese Patent Application Laid-Open No. 5-11178 discloses a technique for selecting defocus amounts, which are in an order designated by counting from the short-distance side, from among effective defocus amounts obtained from multiple lines or areas.

The specification of Japanese Patent Application Laid-Open No. 6-138378 discloses a method of selecting a focus-measurement point that conforms to the intent of the operator based upon an output from line-of-sight detecting means and the reliability thereof.

The specification of Japanese Patent Application Laid-Open No. 2006-145862 discloses a method of determining the similarity of a plurality of pairs of image signals and, in a case where similarity is high or identical defocus amounts are obtained, combining a plurality of image signals, generating pairs of image signals and performing a correlation computation.

The specification of Japanese Patent Application Laid-Open No. 2002-258142 discloses a sensor in which, when a signal representing a subject is small, sums signals in a direction that is perpendicular to a pupil dividing direction and reads out the sum.

In general, a focus detection apparatus is required to have certain functions. For example, besides accuracy at the time of focusing, one function is the ability to capture the main subject suitably in scenes where subjects are at long and short distances, and another function is the ability to perform focus detection in situations of diminished brightness.

In order to achieve the ability to detect focus under conditions of diminished brightness, hardware-based improvements are conceivable. These include raising the sensitivity of the focus detection sensor, lengthening the time over which the signal from a focus detection sensor is accumulated and adopting a divided-pupil arrangement in which the quantity of light that is incident upon a focus detection sensor is increased. In addition, a software approach for synthesizing a focus detection sensor signal has also been adopted. In a case where a focus detection sensor signal is synthesized, often a pair of image signals is obtained by combining a plurality of pairs of image signals in a direction that is perpendicular to the pupil dividing direction. Such processing makes focus detection possible under conditions of diminished brightness while suppressing degradation of image signals in the direction of correlation. On the other hand, when such processing is executed, there are instances where an inappropriate result of computation is obtained if the same subject does not appear at each pixel that is to undergo synthesis. Further, if an image that can be approximated by a line that is oblique with respect to the direction of correlation appears, there are instances where it is difficult to obtain a correlation from the result of addition.

DISCLOSURE OF INVENTION

The present invention has been devised in view of the circumstances set forth above and makes it possible to perform suitable focus detection with regard to a subject under diminished brightness.

In accordance with a first aspect of the present invention, an image capturing apparatus comprises: an image sensor provided in the neighborhood of an image plane of a photographing optical system for forming the image of a subject; pupil dividing means for forming images of a pair of light beams that have passed through different pupil regions of the photographing optical system; focus detection sensors arranged two-dimensionally for photoelectrically converting images of the pupil dividing means; and correlation calculation means which, in order to obtain one focus measurement value from one pair of two-dimensional images generated by the focus detection sensors and extending in the pupil dividing direction of the pupil dividing means and in a direction perpendicular to the pupil dividing direction, calculates the correlation between the pair of two-dimensional images while shifting the pair of two-dimensional images in the pupil dividing direction.

In accordance with a second aspect of the present invention, a method of controlling an image capturing apparatus, which has an image sensor provided in the neighborhood of an image plane of a photographing optical system for forming the image of a subject, pupil dividing means for forming an image of a pair of light beams that have passed through different pupil regions of the photographic optical system, and focus detection sensors arranged two-dimensionally for photoelectrically converting images of the pupil dividing means, comprises a correlation calculation step for obtaining one focus measurement value from one pair of two-dimensional images generated by the focus detection sensors and extending in the pupil dividing direction of the pupil dividing means and in a direction perpendicular to the pupil dividing direction, the correlation calculation step being a step of calculating the correlation between the pair of two-dimensional images while shifting the pair of two-dimensional images in the pupil dividing direction.

Further features of the present invention will become apparent from the following description of exemplary embodiments with reference to the attached drawings.

BEST MODE FOR CARRYING OUT THE INVENTION

Embodiments of the present invention will now be described in detail with reference to the drawings.

First Embodiment

FIGS. 1 to 15 are diagrams useful in describing a first embodiment of the present invention and reference will be made to these drawings to describe the first embodiment.

Figure 1:
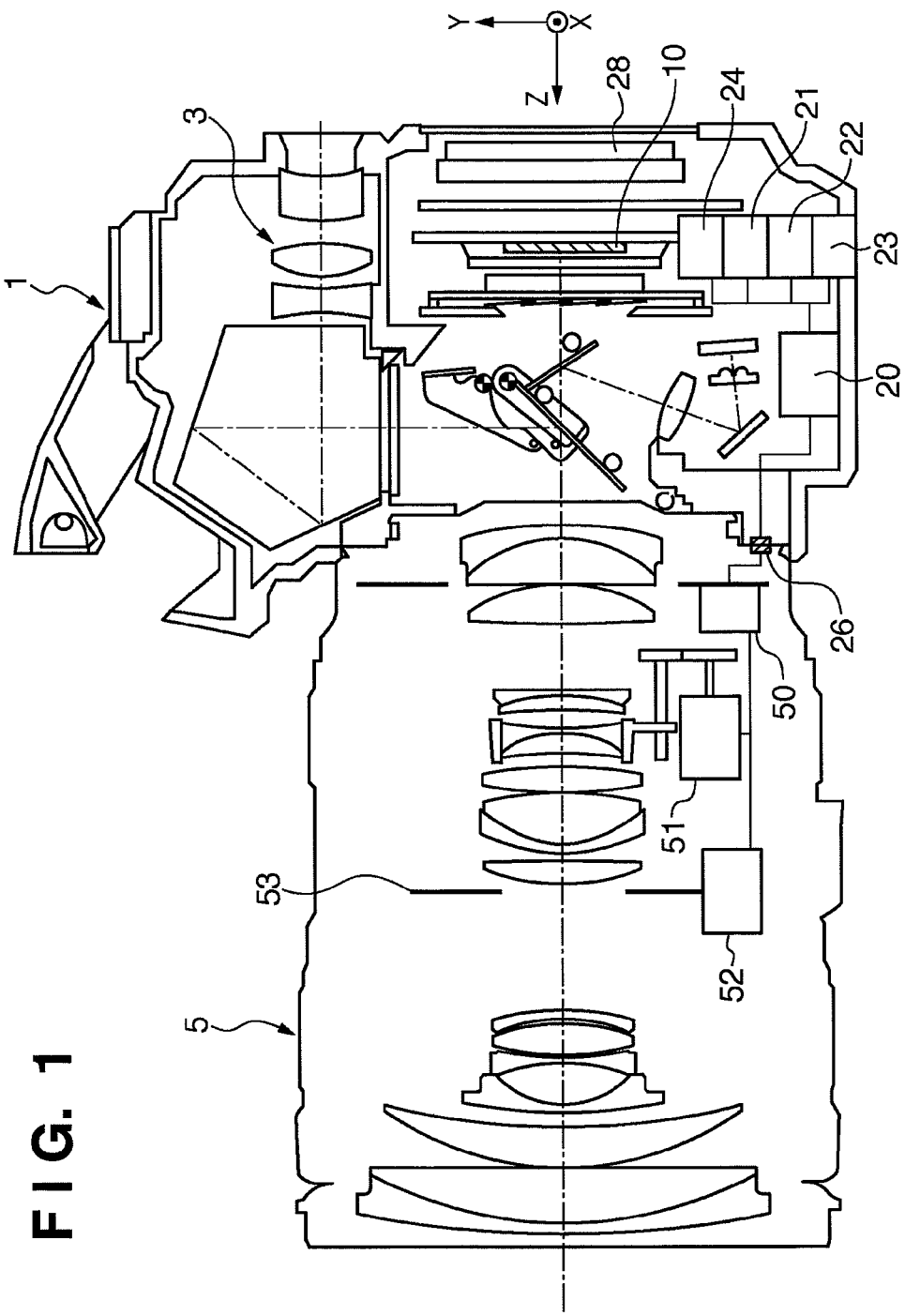
FIG. 1 is a diagram showing the structure of a camera according to a first embodiment of the present invention.

FIG. 1 is a sectional view of a camera equipped with a focus detection apparatus according to this embodiment.

As shown in FIG. 1, an image sensor (solid-state image sensing device) 10 is disposed in the image plane of a shooting lens (photographic optical system) 5 of a digital still camera 1. The digital still camera 1 includes a CPU 20 for controlling the overall camera, an image sensor control circuit 21 for driving and controlling the image sensor 10, and an image processing circuit 24 for applying image processing to an image signal captured by the image sensor 10. The digital still camera 1 further includes an eyepiece lens 3 for observing the image of a subject, a memory circuit 22 for recording the image captured by the image sensor 10, and an interface circuit 23 for outputting the image, which has been processed by the image processing circuit 24, to the exterior of the camera. The memory circuit 22 is also capable of storing the distribution of light received by the image sensor 10.

The shooting lens 5 is a lens removably attached to the camera body of the digital still camera 1. The shooting lens 5 receives focus adjustment information, which is sent from the CPU 20 of the camera body, at a lens CPU 50 via an electrical contact 26, and is adjusted to the in-focus state by a shooting-lens drive mechanism 51 based upon this focus adjustment information. Further, a diaphragm device 53, which is placed in the vicinity of the pupil of the shooting lens 5, is stopped down to a prescribed f-stop number by a diaphragm drive mechanism 52.

The CPU 20 also has a function for calculating the state of focus of the shooting lens 5.

Figure 2:
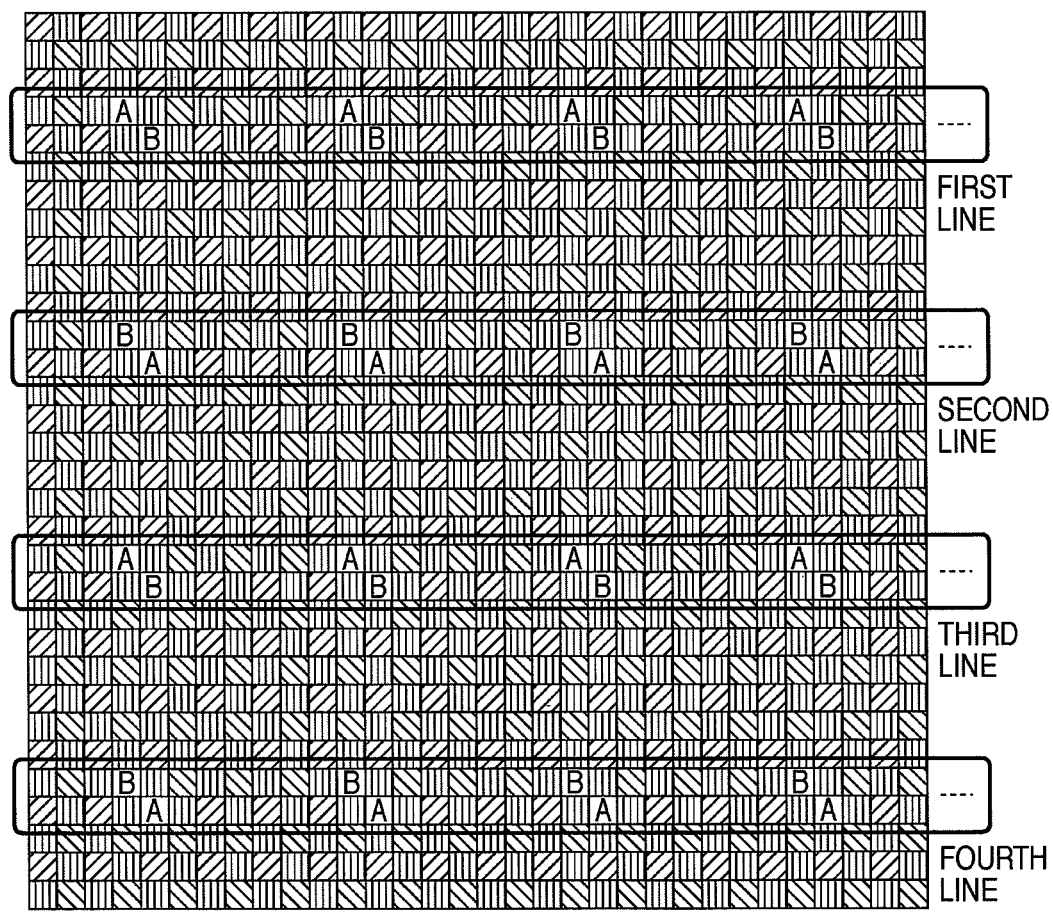
FIG. 2 is a partial plan view of an image sensor.

FIG. 2 is a partial plan view of the image sensor. The characters "R", "G", "B" represent the hues of color filters at each pixel. Pixels to which the characters "R", "G", "B" have been assigned transmit light of red, green and blue components, respectively. The hues of "R", "G", "B" in FIG. 2 are indicated by the hatching patterns. Further, the pixels of "R", "G", "B" are arranged in the so-called Bayer array.

Since the array of color filters is the Bayer array, one picture element is composed of "R" and "B" pixels and two "G" pixels. However, in the image sensor constituting the digital still camera of this embodiment, focus detection pixels, which receive light beams that have passed through part of the pupil region of the shooting lens 5, are assigned to some pixels which are supposed to be "R" or "B". In FIG. 2, pixels indicated by A and B are pixels for detecting the state of focus of the shooting lens 5, and the openings of these pixels along the x direction (the horizontal direction in FIG. 3) are limited by an electrode 131 shown in FIG. 3. Further, light beams that have passed through different pupil regions form images at A and B, as will be described later. That is, the focus detection sensor is placed on the image plane of the image sensor 10.

In FIG. 2, the pixels indicated by A and B are made adjacent to each other and the distance between then is made as short as possible. By adopting this contrivance, the pixels indicated by A and B minimize the possibility that different patterns will be seen. This reduces focus detection error. Boundary positions are made to coincide at odd- and even-numbered lines and the positions of the pixels indicated by A and B are reversed. Therefore, even in a case where the edge portion of a subject extends to the boundary portions of the pixels indicated by A and B, in an instance where the phases of the images obtained from the pixels indicated by A and B shift, both will be generated simultaneously. Moreover, the amounts of such shift are equal and oppositely directed. Accordingly, in the digital still camera of this embodiment, focus detection error is cancelled out by subjecting lines adjacent to a direction that is perpendicular to the pupil dividing direction to a correlation calculation using at least two sets of these lines. This corresponds to always designating an odd number in a decision regarding the number of image pairs, described later. This enables a reduction in focus detection error.

Figure 3:
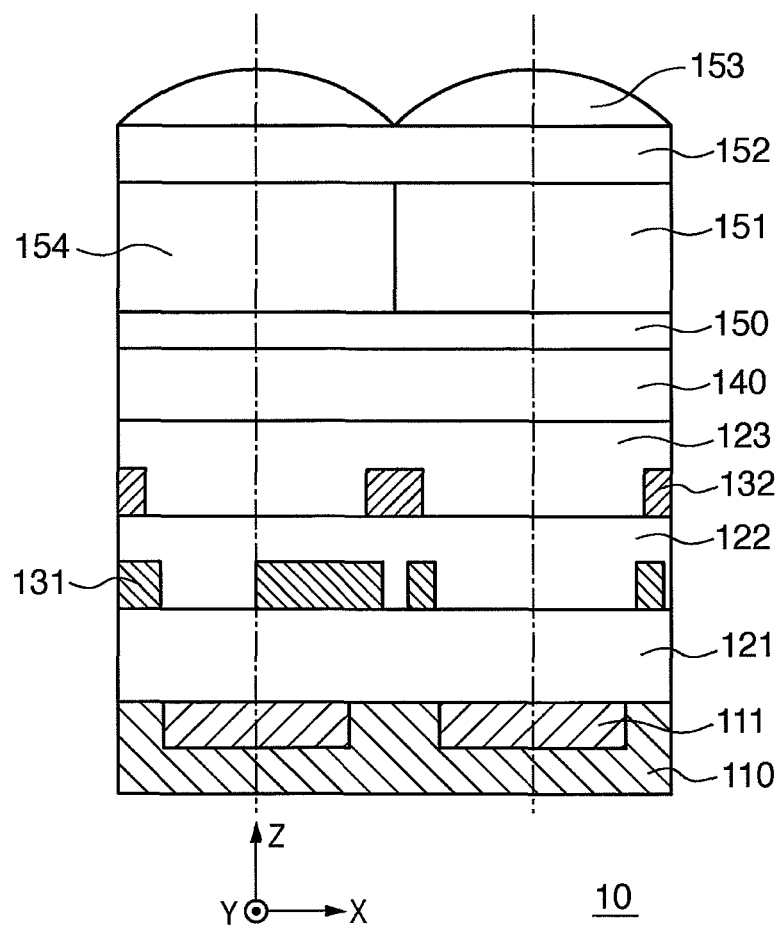
FIG. 3 is a partial sectional view of an image sensor.

FIG. 3 is a sectional view of pixels in the image sensor 10 shown in FIG. 2 and illustrates a pixel whose opening along the x direction is limited and a pixel capable of receiving light from the entire pupil region. The pixel on the right side of FIG. 3 is capable of receiving light from the entire pupil region of the shooting lens 5, and the pixel on the left side is capable of receiving a light beam from part of the pupil region of the shooting lens 5 because the opening of this pixel has been limited along the x direction. This will be described later with reference to FIGS. 4A and 4B.

The image sensor 10 includes a photoelectric transducer 111 formed inside a silicon substrate 110. Signal charge generated by the photoelectric transducer 111 is output to the exterior via a floating depletion area (not shown), a first electrode 131 and a second electrode 132. An interlayer insulating film 121 is formed between the photoelectric transducer 111 and first electrode 131, and interlayer insulating film 122 is formed between the first electrode 131 and the second electrode 132. A interlayer insulating film 123 is formed on the light-incident side of the electrode 132, a passivation film 140 is formed on interlayer insulating film 123, and a flattening layer 150 is formed on the passivation film 140. A color filter layer 151, a flattening layer 152 and a microlens 153 are formed on the light-incident side of the flattening layer 150. The power of the microlens 153 is set in such a manner that the pupil of the shooting lens 5 and the photoelectric transducer 111 are approximately conjugate. Further, at a pixel situated at the center of the image sensor 10, the microlens 153 is placed at the center of the pixel; at a pixel situated at the periphery, the microlens 153 is situated offset to the optic-axis side of the shooting lens 5.

Light from a subject that has passed through the shooting lens 5 is condensed in the neighborhood of the image sensor 10. Light that has reached each pixel of the image sensor 10 is refracted by the microlens 153 and is condensed on the photoelectric transducer 111. At the pixel on the right side in FIG. 3, which pixel is used for ordinary image capture, the first electrode 131 and second electrode 132 are arranged so as not to block the incident light.

On the other hand, at the pixel on the left side for detecting focusing of the shooting lens 5, part of the electrode 131 is adapted so as to cover the photoelectric transducer 111. As a result, a light beam that passes through a portion of the pupil of the shooting lens 5 is capable of being received by the focus detection pixel on the left side in FIG. 3. Further, the output of the photoelectric transducer 111 is diminished since the electrode 131 blocks part of the incident light beam. In order to alleviate this, however, a color filter layer 154 placed over the focus detection pixel is formed from a high-transmittance resin that will not absorb light.

Figure 4A:
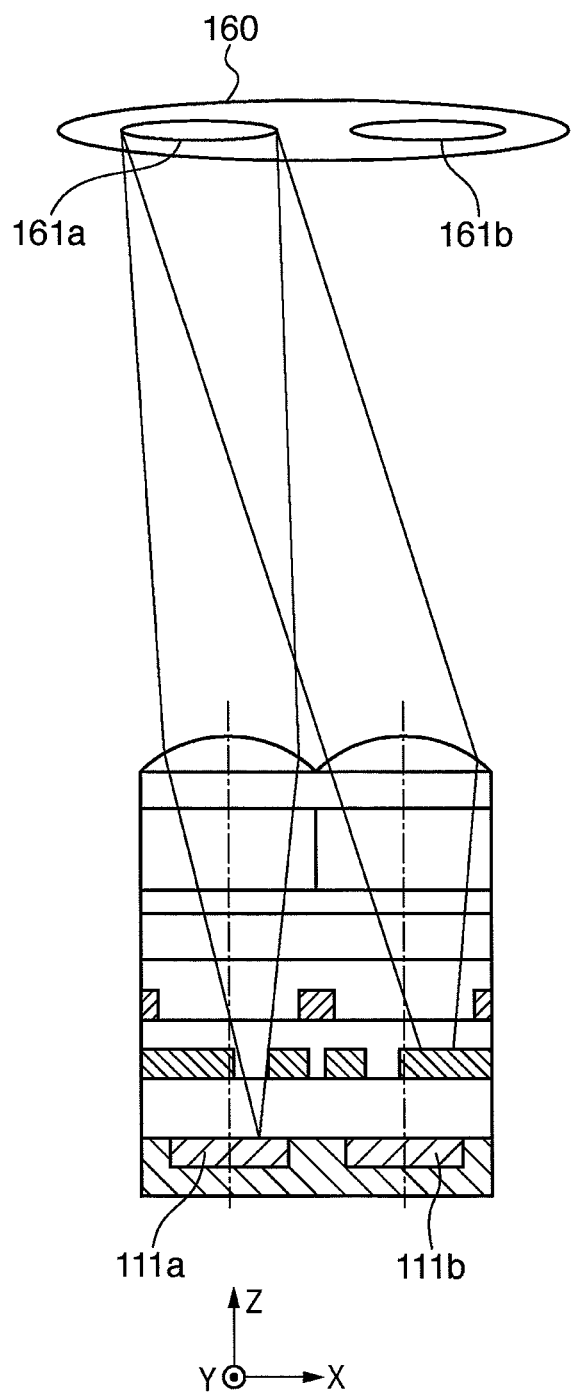
FIG. 4A is a diagram useful in describing a region in which light impinges upon a focus detection sensor.
Figure 4B:
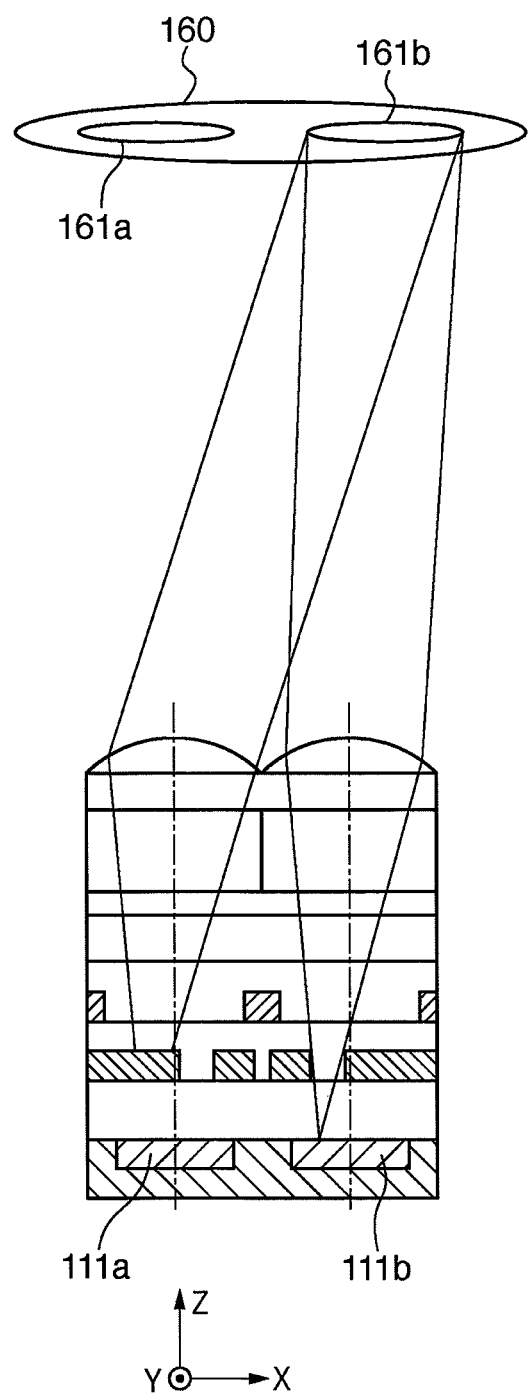
FIG. 4B is a diagram useful in describing a region in which light impinges upon a focus detection sensor.

FIGS. 4A and 4B are diagrams illustrating the relationship between the cross section of the pixels A and B in FIG. 2 and a pupil. The pixel on the left side of FIGS. 4A, 4B corresponds to the pixel identified by character A in FIG. 2 (this pixel will be referred to as the "A pixel" below), and the pixel on the right side corresponds to the pixel identified by character B in FIG. 2 (this pixel will be referred to as the "B pixel" below). The shooting lens 5 has a pupil 160, which is illustrated schematically in FIGS. 4A and 4B. Reference characters 111a, 111b denote photoelectric transducers associated with the A and B pixels, respectively. FIG. 4A is a diagram useful in describing the optical path of a light beam that has passed through a pupil region 161a, and FIG. 4B is a diagram useful in describing the optical path of a light beam that has passed through a pupil region 161b.

As shown in FIGS. 4A and 4B, the openings of the A and B pixels are provided so as to have different amounts of eccentricity with respect to the optic axis of the microlenses 153. As a consequence, the light beam that has passed through the pupil region 161a shown in FIG. 4A reaches the photoelectric transducer 111a of the A pixel but not the photoelectric transducer 111b of the B pixel. Conversely, the light beam that has passed through the pupil region 161b shown in FIG. 4B reaches the photoelectric transducer 111b of the B pixel but not the photoelectric transducer 111a of the A pixel.

In the divided-pupil structure shown in FIGS. 4A, 4B in which it is possible to obtain light beams that have passed through regions that are a part of the pupil of the shooting lens 5, the direction indicating the relative positions of the two pupil regions mentioned above (this direction is the X-axis direction in this embodiment) is defined as the pupil dividing direction, and the direction perpendicular to the pupil dividing direction in a plane orthogonal to the optic axis (this direction is the Y-axis direction in this embodiment) is defined as the direction perpendicular to pupil dividing direction. Further, in this embodiment, the image sensor 10, which only has pixels for which the pupil dividing direction exists along the X-axis direction, is described. However, the image sensor may just as well be one in which pixels having the pupil dividing direction at a right angle (the Y-axis direction) to this direction are superimposed. The present invention defines directions as the pupil dividing direction and the direction perpendicular to the pupil dividing direction. If attention is paid to these, therefore, then the present invention can be applied to focus detection pixels having the pupil dividing direction along the Y-axis direction.

Figure 5A:
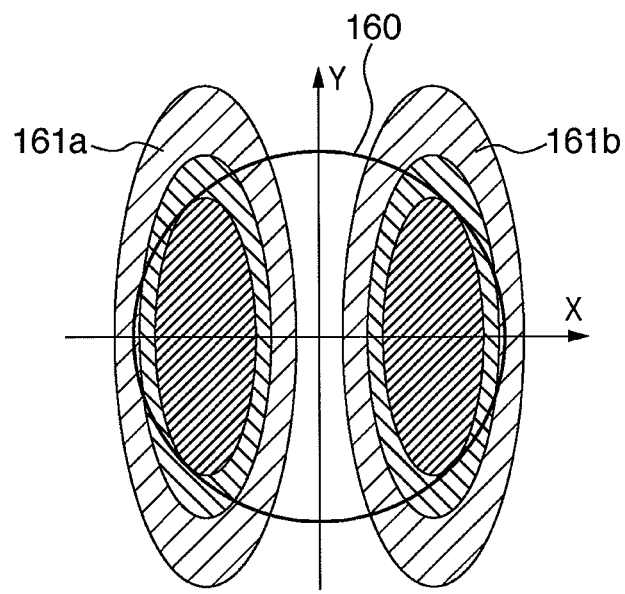
FIG. 5A is a diagram useful in describing a characteristic of incidence upon a focus detection pixel on the surface of a pupil.
Figure 5B:
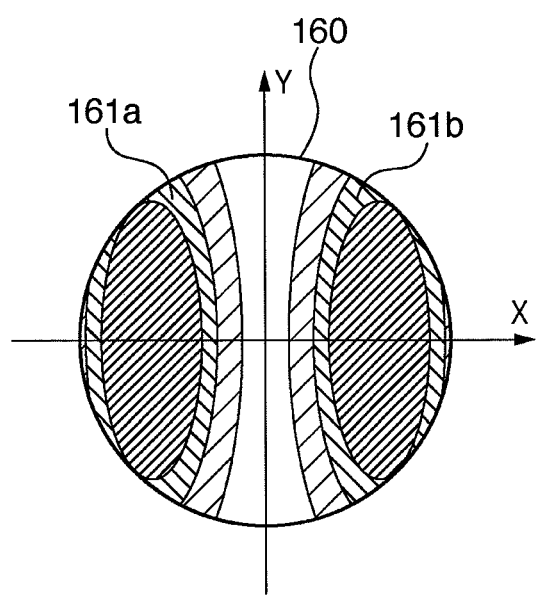
FIG. 5B is a diagram useful in describing a characteristic of incidence upon a focus detection pixel on the surface of a pupil.
Figure 5C:
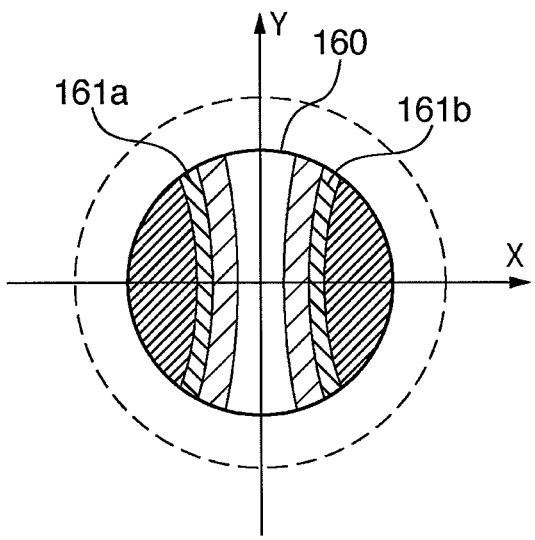
FIG. 5C is a diagram useful in describing a characteristic of incidence upon a focus detection pixel on the surface of a pupil.

FIGS. 5A to 5C are diagrams schematically illustrating light beams that impinge upon the A and B pixels from pupil 160 of the shooting lens 5. FIG. 5A is a diagram illustrating the relationship between regions in which light impinges upon the A and B pixels and the pupil, FIG. 5B is a diagram illustrating the manner in which the regions where light impinges upon the A and B pixels are cut off at the pupil, and FIG. 5C is a diagram illustrating the manner in which the regions in which light impinges upon the A and B pixels are cut off at the pupil when a diaphragm is actuated.

In FIGS. 5A to 5C, the region in which light impinges upon the A pixel is indicated at 161a, the region in which light impinges upon the B pixel is indicated at 161b, and the ratio of incident light is indicated by the shade of gray. Light from a dark region impinges in large quantity, and light from a bright region impinges in small quantity or does not impinge at all. The reason for the difference in ratio at which light impinges owing to the pupil regions is microlens aberration, an error in matching the optical powers and the diffraction of light.

As illustrated in FIG. 5A, regions in which light impinges upon the A and B pixels exist also on the outer side of the pupil 160 of shooting lens 5. In actuality, however, vignetting is produced by the lens and light in the zone cut off at the pupil 160 as shown in FIG. 5B reaches the image sensor 10. Furthermore, in a case where the diaphragm has been stopped down to a prescribed f-stop number by the diaphragm drive mechanism 52, the light beams in the regions 161a, 161b in FIG. 5C impinge upon the A and B pixels, respectively, with vignetting occurring in the region decided by the stopped-down pupil diameter as shown in FIG. 5C. It will be understood that if the state of the shooting lens 5 is changed, as by changing the diaphragm aperture, then the amounts of light that impinge upon the A and B pixels will change also.

Figure 6:
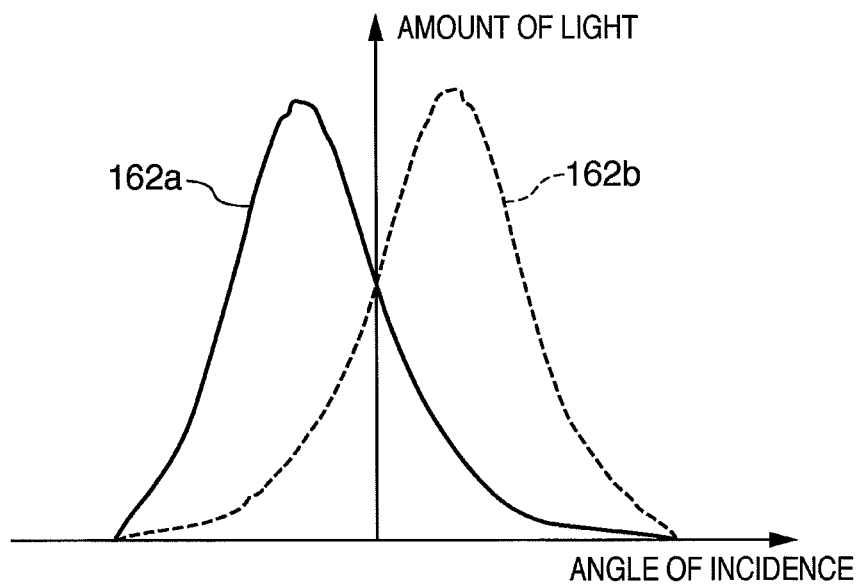
FIG. 6 is a diagram useful in describing a line image.

FIG. 6 expresses the light beams from the regions of FIG. 5B as one-dimensional images obtained by integration in the direction perpendicular to the pupil dividing direction. FIG. 6 corresponds to line-image distributions produced by a group of focus detection pixels. Shown in FIG. 6 are a line-image distribution 162a of the A pixel and a line-image distribution 162b of the B pixel. As will be understood from FIG. 6, the A and B pixels have different incidence-angle characteristics and therefore an image deviation in the pupil dividing direction occurs between the images of the A and B pixels when defocusing is performed. It is possible to perform so-called phase-difference-based focus detection, which finds the amount of defocus taking into consideration the amount of image deviation and the line-image distributions of FIG. 6.

Figure 7:
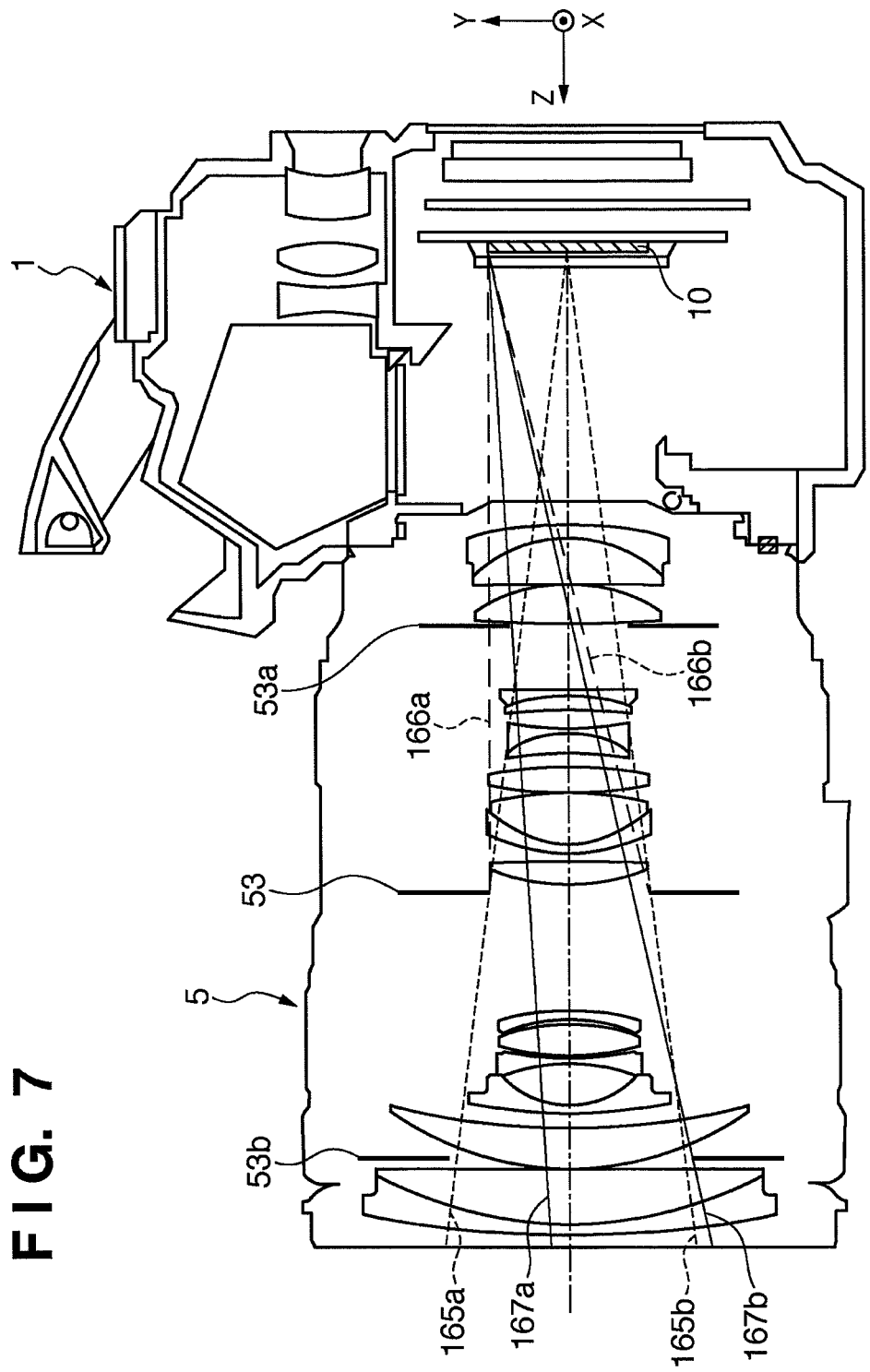
FIG. 7 is a diagram useful in describing the window frames of a lens.

Reference will be had to FIGS. 7 and 8 to describe what kind of signal enters the focus detection sensor when the image height of the image sensor in the camera according to this embodiment is changed. In order to simplify the description, the description will be rendered using a point having an image height in the Y direction of FIG. 7. However, the same considerations will apply also in cases where the image height is taken along the X direction or along both the X and Y directions.

Shown in FIG. 7 are the diaphragm device 53 placed in the neighborhood of the pupil of the shooting lens 5, a window frame 53a provided on the side of the diaphragm device 53 on which the image sensor 10 is located, and a window frame 53b provided on the side of the diaphragm device 53 that is opposite the image sensor 10. Further, light rays 165a, 165b are directed from the center of the image sensor 10 toward the diaphragm device 53, and light rays 166a, 166b are directed from a certain point having an image height in the Y direction of the image sensor toward the diaphragm device 53. Furthermore, of the light that impinges upon the certain point having the image height in the Y direction of the image sensor, light rays 167a, 167b have been regulated by the window frames.

In view of the fact that the window frames are regulated as by a lens holding frame, the light rays will not be vignetted by the window frames 53a, 53b at the center of the image sensor 10 in the example of FIG. 7. However, at a position having a high image height, there are cases where vignetting occurs in the upper and lower light rays at the window frames 53a, 53b owing to the fact that the window frames 53a, 53b protrude inwardly more than the light rays directed toward the diaphragm device 53. In the example of FIG. 7, light rays in the positive Y direction are regulated by the window frame 53a, and light rays in the negative Y direction are regulated by the window frame 53b. This is illustrated schematically in FIGS. 8A to 8C.

Figure 8A:
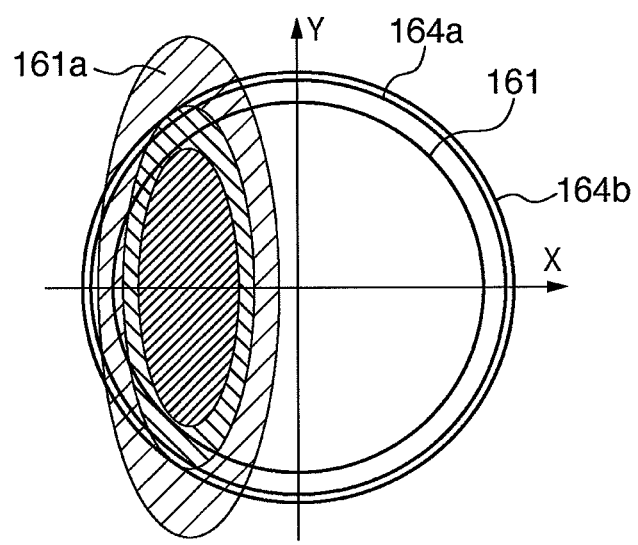
FIG. 8A is a diagram useful in describing vignetting at a window frame.
Figure 8B:
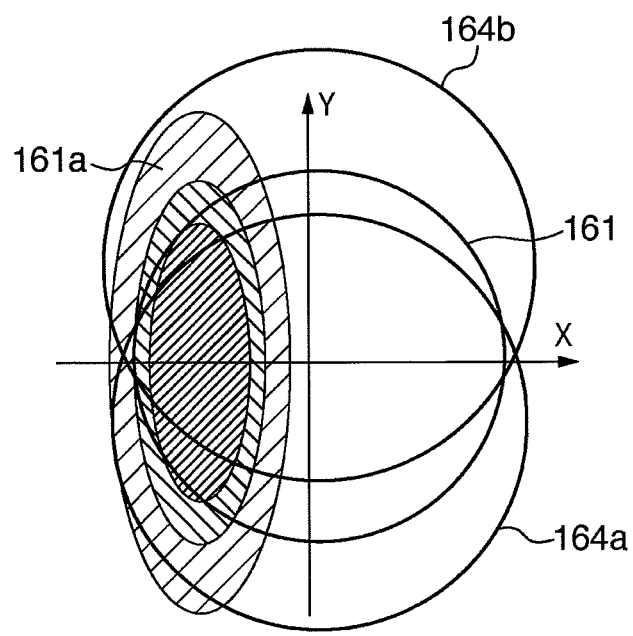
FIG. 8B is a diagram useful in describing vignetting at a window frame.
Figure 8C:
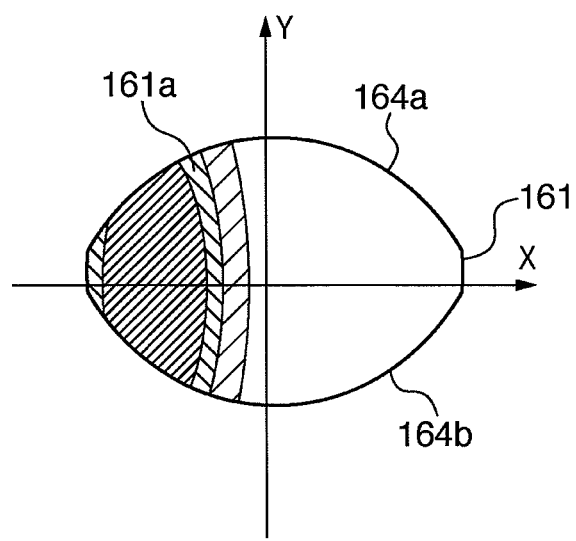
FIG. 8C is a diagram useful in describing vignetting at a window frame.

In FIGS. 8A to 8C, only the signal associated with the A pixel is illustrated in order to simplify the diagram. Illustrated in FIGS. 8A to 8C is the region 161a in which light impinges upon the A pixel. A frame 161 is defined by the diaphragm 53, and frames 164a, 164b are defined by the window frames 53a, 53b, respectively. FIG. 8A is a diagram useful in describing a case where the view is from the center of the image sensor 10, FIG. 8B is a diagram useful in describing a case where the view is from a position having a high image height, and FIG. 8C is a diagram illustrating the manner in which the region where light impinges upon the A pixel is cut off at the pupil.

In the case where the view is from the center of the image sensor 10, as illustrated in FIG. 7 and FIG. 8A, the window frames 53a, 53b are situated farther out than the diaphragm 53 and therefore the amount of light that impinges upon the A pixel is not regulated. In the case where the view is from the position having the high image height, the frames 164a, 164b that are the result of projecting the window frames 53a, 53b onto the pupil plane are offset in accordance with the image height, as illustrated in FIG. 7 and FIG. 8B. In FIG. 8B, since the view is from a position in the positive Y direction, the projected image 164a of the window frame 53a near the image sensor 10 is offset in the negative Y direction and the projected image 164b of the window frame 53b on the side remote from the image sensor 10 is offset in the positive Y direction. As a result, a region which protrudes inwardly more than the frame 161 defined by the window frame 53 appears. In the illustrated example, the region 161a where light impinges upon the A pixel is cut off at 161, 164a, 164b decided by the window frames 53, 53a, 53b, respectively, as illustrated in FIG. 8C. As will be evident from FIG. 8C, light that reaches the focus detection sensor tends to lessen at a location where the image height is great. Therefore, in a decision regarding the number of image pairs used in a correlation calculation described later, these facts are taken into consideration to determine the number of image pairs appropriately in accordance with image height.

FIGS. 9A to 11 are flowcharts for describing camera focus adjustment and photography steps relating to this embodiment.

Figure 9A:
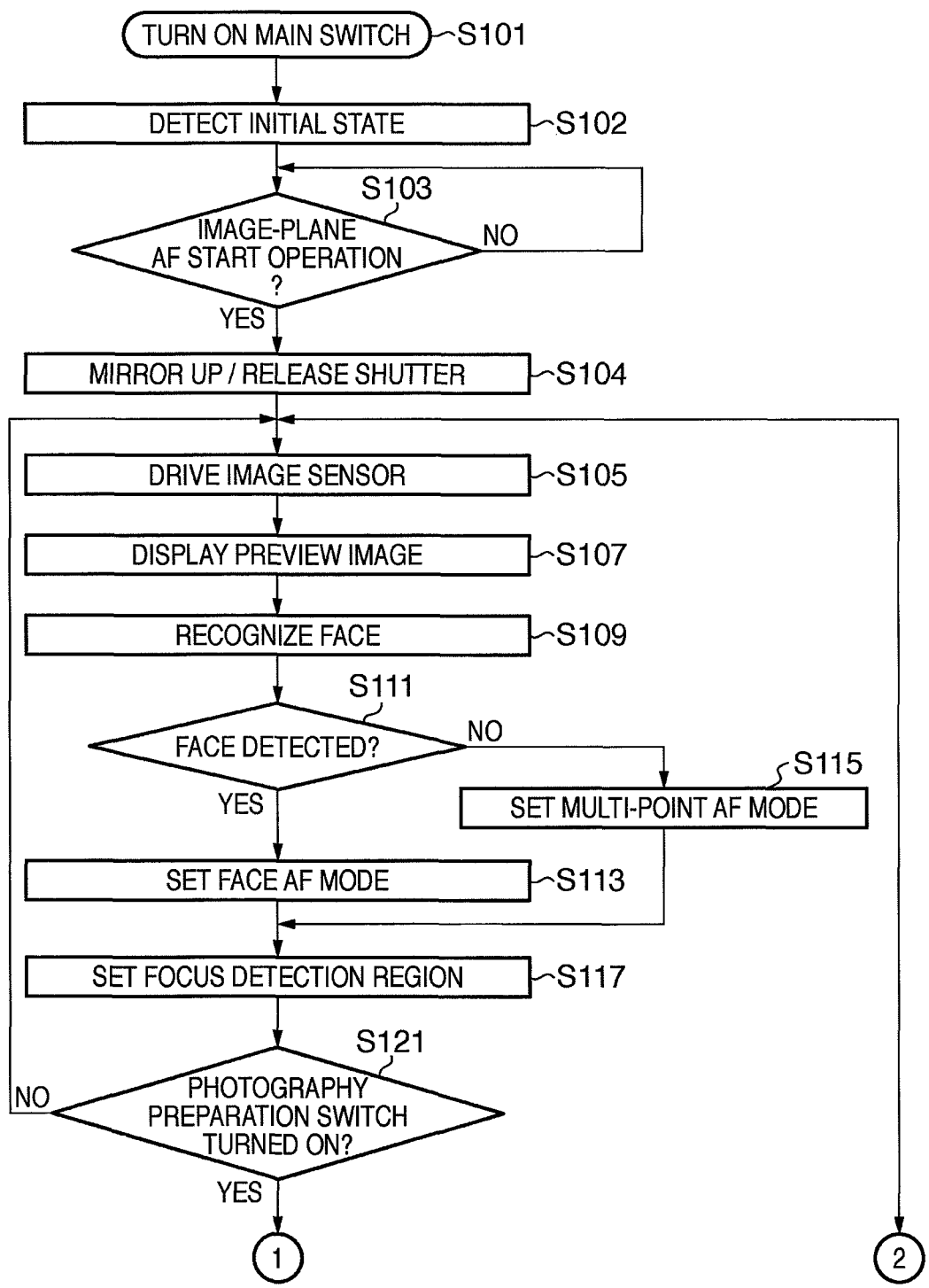
FIGS. 9A and 9B are main flowcharts illustrating the operation of a digital still camera.
Figure 9B:
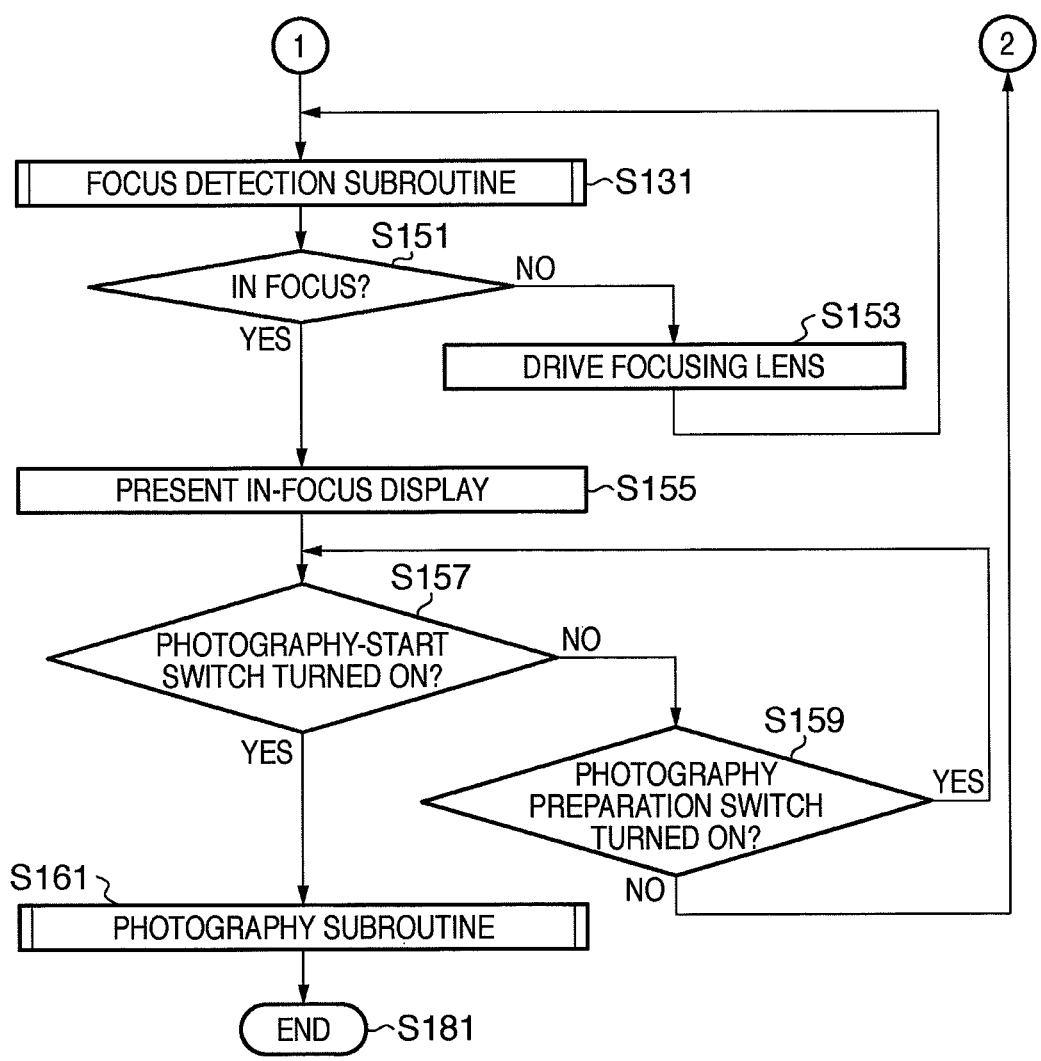

FIGS. 9A and 9B are main flowcharts illustrating the operation of the digital still camera of this embodiment.

When the photographer turns on a camera power switch (step S101), control proceeds to step S102. Here the lens CPU 50 confirms the operation of actuators and of the image sensor within the camera, initializes memory content and the execution program and performs an operation to prepare for photography. Whether image-plane autofocus (AF) is to be performed is determined in step S103. If image-plane AF is to be performed, mirror-up and shutter-release operations are performed in step S104. Image capture by the image sensor is started and a moving image for preview is output in step S105. In step S107, the preview moving image that has been read out is displayed on a display unit 28 provided on the back of the camera. The photographer observes this preview image and composes the picture to be taken at the time of photography.

In step S109, whether a face exists in the moving image for preview is recognized. If the fact that a face exists in the shooting zone is recognized, control proceeds from step S111 to step S113, where the focus adjustment mode is set to the face AF mode. The face AF mode refers to an AF mode in which the face in the shooting zone is brought into focus.

On the other hand, if a face does not exist in the shooting zone, then control proceeds from step S111 to step S115, where the focus adjustment mode is set to the multi-point AF mode. The multi-point AF mode refers to a mode in which the shooting zone is divided into, for example, 3×5=15 zones, focus detection is performed in each divided zone, the main subject is inferred from the results of focus detection and information concerning the brightness of the subject, and the zone is brought into focus.

If the AF mode is set in step S113 or S115, focus detection region is decided in step S117. In step S121, it is determined whether a photography preparation switch has been turned on. If the switch has not been turned on, control returns to step S105 and the decision regarding the focus detection region in step S117 is repeatedly executed starting from the driving of the image sensor.

If the photography preparation switch is turned on in step S121, then control proceeds to step S131 and a focus detection subroutine is executed.

Figure 10:
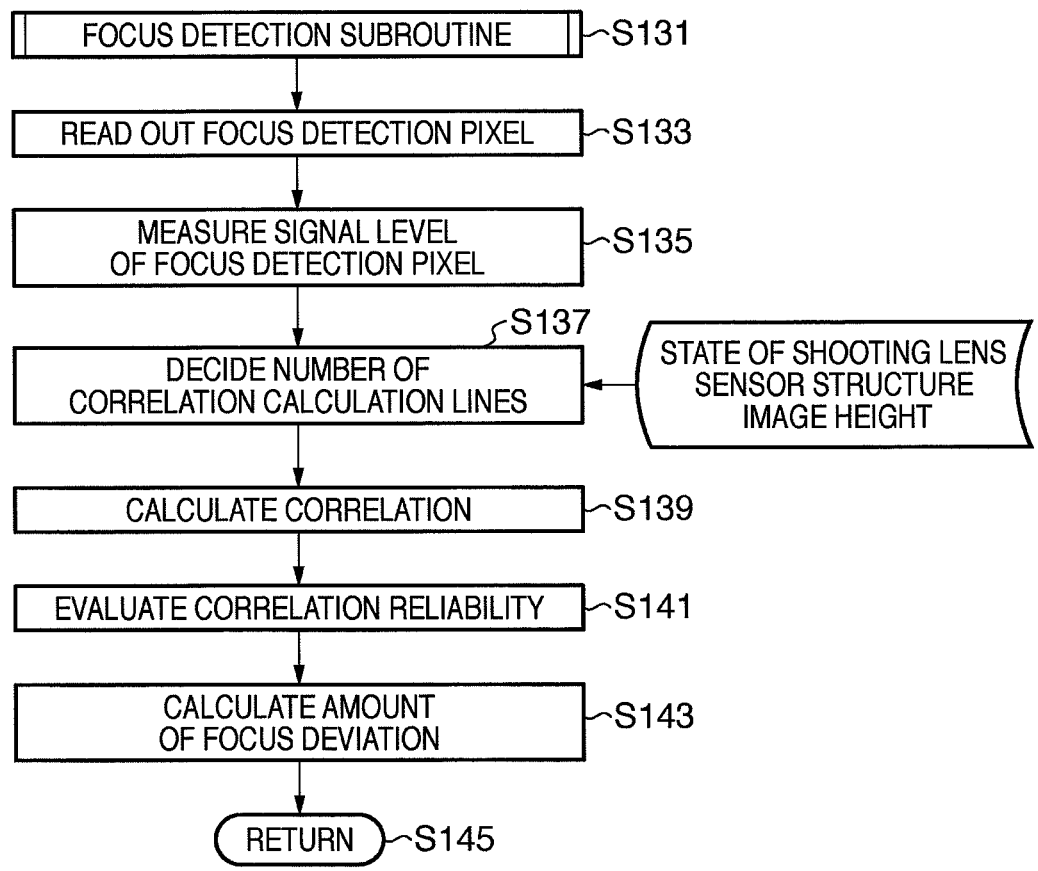
FIG. 10 is a flowchart illustrating a focus detection subroutine.

FIG. 10 is a flowchart of the focus detection subroutine.

If control jumps from step S121 of the main flow to step S131 of this subroutine, focus detection pixels included in the focus detection region decided in step S117 in the main routine are read out in step S133. In step S135, the signal level of the focus detection pixels described in FIG. 2 is obtained. For example, an average value, etc., of signals from all focus detection pixels is applied as the representative value of signal level. In step S137, the number of image pairs to undergo a correlation calculation is decided taking into consideration the signal level found in step S135 and the optical state of the shooting lens 5, the image height and the pixel arrangement, etc., described in FIG. 2. In the pixel arrangement described in FIG. 2, designating an odd number of image pairs is convenient. Deciding the number of image pairs described here corresponds to finding nj in Equation (2) cited below. In step S139, the correlation of image pairs obtained is performed and the amount of positional deviation of image pairs is calculated.

Various correlation calculation equations have been proposed. One method proposed heretofore in the prior art is to sum the absolute values of image-pair differences as indicated by Equation (1) below.

$$\text{when } k \geq 0 \text{ holds, } COR(k) = \sum_{i}^{ni} |A_{i+k} - B_i| \qquad \text{Eq. (1)}$$

$$\text{when } k < 0 \text{ holds, } COR(k) = \sum_{i}^{ni} |A_i - B_{i+k}|$$

In Equation (1), $A_i$, $B_i$ represent the luminances of ith pixels of the A and B pixels, respectively. Further, ni is a numeral representing the number of pixels used in the calculation and is set appropriately in accordance with the length of the ranging visual field, etc. For example, a defocus amount is calculated using, as the in-focus position, the k for which COR(k) in Equation (1) is minimum. That is, in the prior art, in a state in which a pair of images has been shifted by k pixels, the absolute value of the difference between the ith A and B pixels in the row direction is obtained and the absolute values are summed with regard to a plurality of pixels in the row direction. The state in which COR(k), which is the value of the sum, is minimized is considered to be the in-focus state, and the shift amount of k pixels for which the sum value COR(k) is minimized is considered to be the defocus amount.

By contrast, according to this embodiment, the difference between each of the A and B pixels is obtained upon moving a two-dimensional image by k pixels only in the pupil dividing direction, and then performing addition with regard to a plurality of columns. Accordingly, the equation for the correlation calculation is defined by Equation (2) below.

$$\text{when } k \geq 0 \text{ holds, } COR(k) = \sum_{j}^{nj} \sum_{i}^{ni} |A_{(i+k)j} - B_{ij}| \qquad \text{Eq. (2)}$$

$$\text{when } k < 0 \text{ holds, } COR(k) = \sum_{j}^{nj} \sum_{i}^{ni} |A_{ij} - B_{(i+k)j}|$$

In Equation (2), $A_{ij}$, $B_{ij}$ represent the luminances of ith pixels of a jth column of the A and B pixels, respectively. Further, ni is a numeral representing the number of pixels used in the calculation, and nj is the number of image pairs, in the column direction, to undergo the correlation calculation decided in step S137. In a manner similar to that of Equation (1), defocus amount is calculated using, as the in-focus position, the k for which COR(k) in Equation (2) is minimum. It should be noted that the subscript k is added only to i and is unrelated to j. This corresponds to performing the correlation calculation while moving the two-dimensional image only in the pupil dividing direction.

In step S141, the reliability of the result of the correlation calculation is evaluated. Reliability refers to degree of agreement between the two images. If the degree of agreement is high, then the reliability of the result of focus detection generally is high. Accordingly, in a case where a plurality of focus detection regions have been selected, information having a high reliability is used preferentially.

In step S143, the amount of focus deviation is calculated from the result of detection having the high reliability. In step S145, control returns to step S151 in the main flow of FIGS. 9A and 9B.

In step S151 in FIGS. 9A and 9B, it is determined whether the amount of focus deviation calculated in step S143 in FIG. 10 is within tolerance. If the amount of focus deviation is equal to or greater than an allowable value, it is determined that the image is out of focus, the focusing lens is driven in step S153 and then steps S131 and S151 are repeated. When it is determined in step S151 that the in-focus state has been attained, an in-focus display is presented in step S155 and control proceeds to step S157.

In step S157, it is determined whether a photography-start switch has been turned on. If the switch has not been turned on, control proceeds to step S159 and whether the photography standby state is to be maintained is determined. If the photography standby state is to be maintained, control proceeds to step S157 again. If the photography standby state is cancelled, control returns to step S105 and the preview operation is carried out again. If the photography-start switch is turned on in step S157, control proceeds to step S161 and a photography subroutine is executed.

Figure 11:
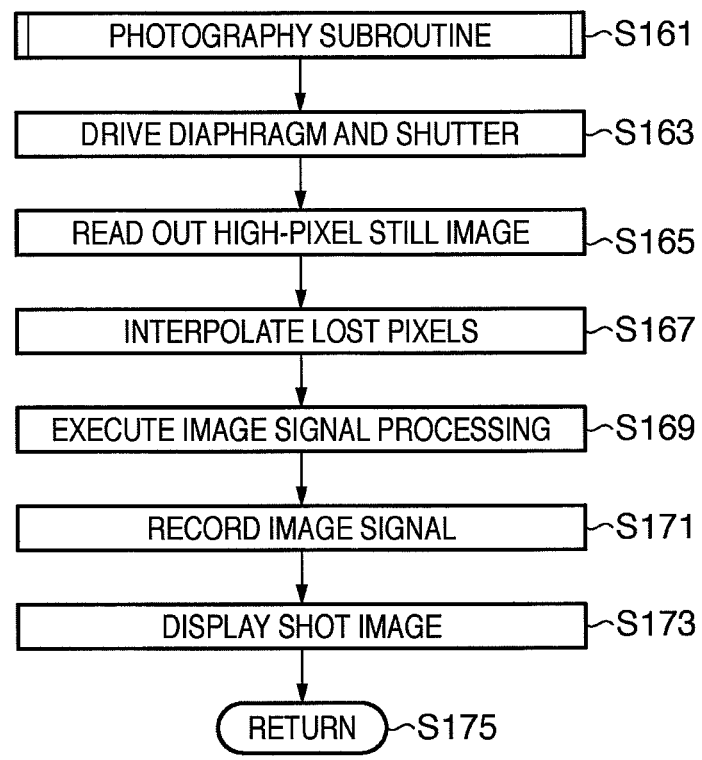
FIG. 11 is a flowchart illustrating a photography subroutine.

FIG. 11 is a flowchart illustrating a photography subroutine.

When the photography-start switch is operated, control proceeds from step S161 to step S163. Here aperture control of a mechanical shutter is carried out to drive a diaphragm for adjusting the amount of light and to regulate exposure time. Driving of the shutter may be performed by causing the shutter to travel again once it has been closed or by causing the shutter to travel in such a manner that it closes after a reset operation is performed electrically. In step S165, image read-out for high-pixel still-image photography, that is, read-out of all pixels, is performed. Specifically, in step S167, lost-pixel interpolation of that has been read out is performed. That is, the output of a focus detection pixel does not have RGB color information for image capture and the pixel is equivalent to a defective pixel in terms of obtaining an image. Consequently, an image signal is created by interpolating it from the information of the surrounding pixels for image capture.

Image processing such as an image gamma correction and edge emphasis is executed in step S169 and the shot image is recorded in memory circuit 22 in step S171. The image that has been shot is displayed on the display unit 28 in step S173 and control returns to the main flow of FIGS. 9A and 9B in step S175.

When control returns to the main flow of FIGS. 9A and 9B, the series of photography operations is ended in step S181.

Next, operation according to this embodiment will be described in detail with reference to FIGS. 12 to 15.

Figure 12:
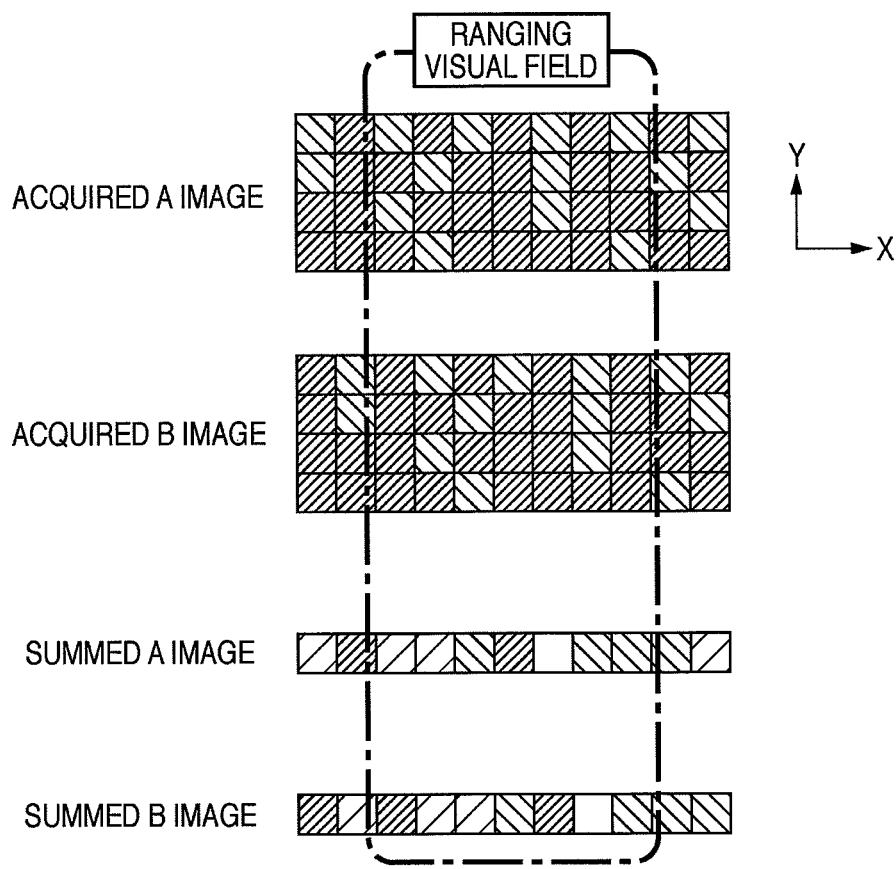
FIG. 12 is a diagram illustrating an example of an image obtained from a focus detection sensor.
Figure 13:
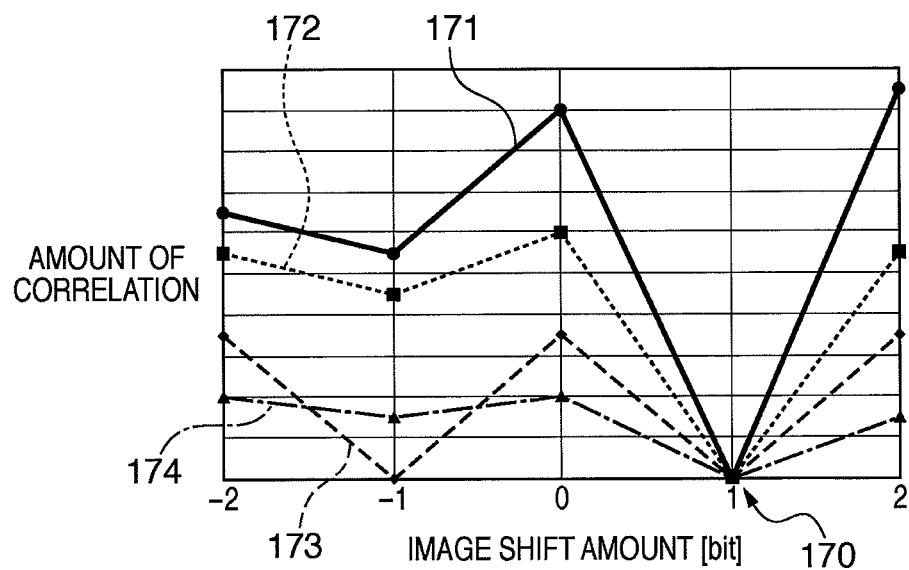
FIG. 13 is a diagram illustrating results of a correlation calculation.
Figure 14:
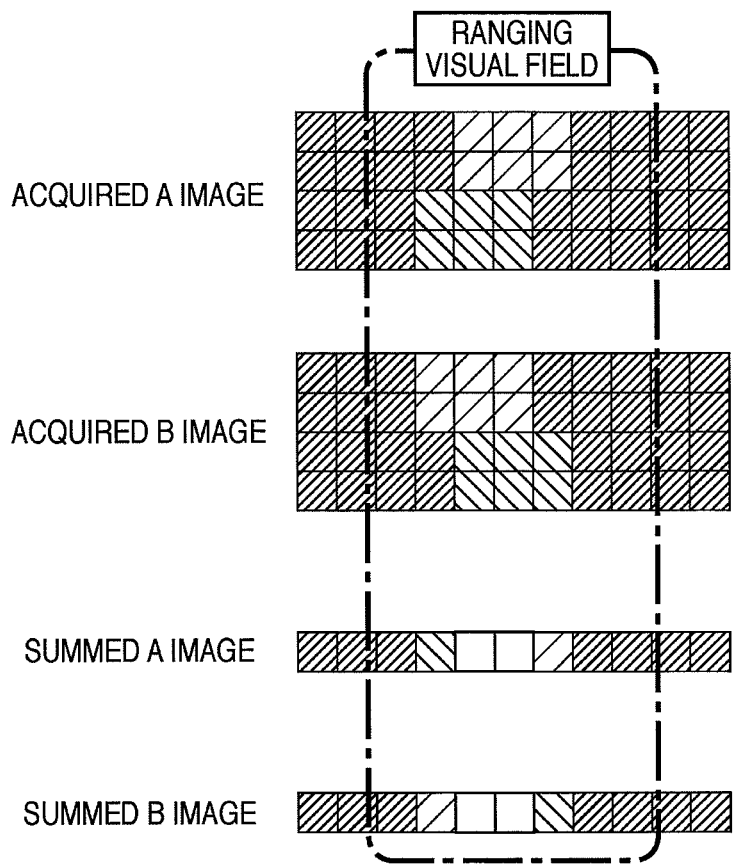
FIG. 14 is a diagram illustrating an example of an image obtained from a focus detection sensor.
Figure 15:
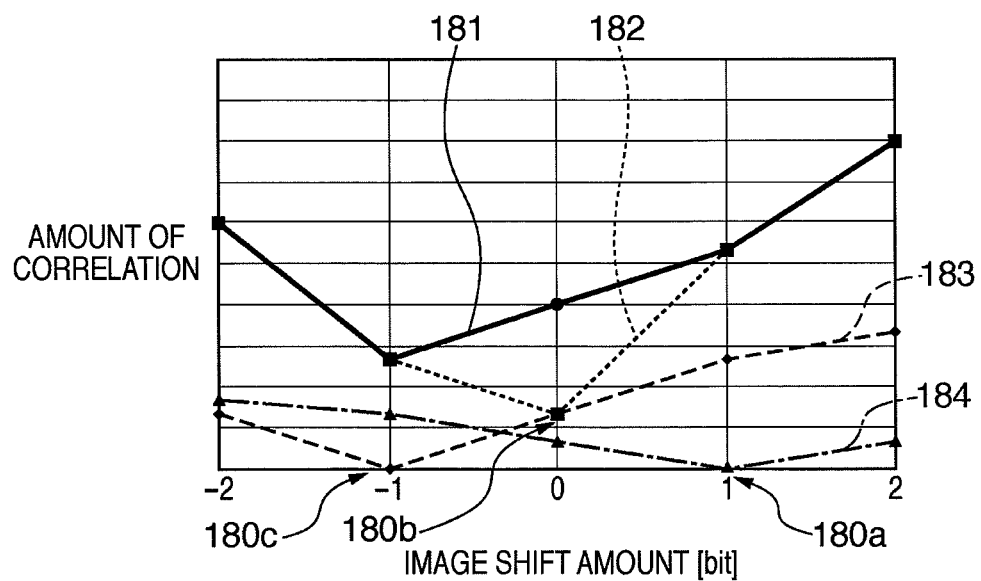
FIG. 15 is a diagram illustrating results of a correlation calculation.

FIGS. 12 and 14 are diagrams illustrating images (referred to as "A image" and "B image" below) obtained from the A and B pixels. The horizontal direction in these diagrams is the pupil dividing direction and the vertical direction is the direction perpendicular to the pupil dividing direction. The shades of gray of the pixels in FIGS. 12 and 14 indicate the amount of light that impinges upon each pixel. A light-shaded pixel indicates schematically a large amount of light, and a dark-shaded pixel indicates schematically a small amount of light. Summed images schematically indicate a light shade in the case of a large amount of light and a dark shade in the case of a small amount of light as a result of addition. FIGS. 13 and 15 are the results of finding amount of correlation between the images of FIGS. 12 and 14 using Equations (1) and (2).

The acquired A image and acquired B image in FIG. 12 indicate images of A and B images composed of 11 pixels (X direction)×4 pixels (Y direction). A summed A image indicates an image obtained by summing pixels in the direction perpendicular to the pupil dividing direction of the acquired A image [namely in the vertical direction (Y direction) of FIG. 12], and the summed B image indicates an image obtained by summing the pixels in the direction perpendicular to the pupil dividing direction of the acquired B image. The ranging visual field has been set to nine pixels in the vicinity of the center.

Further, in order from the top of the acquired A image of FIG. 12, the first line indicates a two-pixel-pitch repetitive pattern, the second line indicates a three-pixel-pitch repetitive pattern, the third line indicates a four-pixel-pitch repetitive pattern, and the fifth line indicates a five-pixel-pitch repetitive pattern. The B image in FIG. 12 is an image obtained by shifting the B image one bit to the right with respect to the A image.

Shown FIG. 13 are a correlation amount 171 calculated using Equation (2) proposed in this embodiment, a correlation amount 172 calculated using Equation (1) with respect to summed images (the above-mentioned summed A image and summed B image), a correlation amount 173 calculated using Equation (1) with respect to line 1, and a correlation amount 174 calculated using Equation (1) with respect to line 3. It should be noted that the number of lines for obtaining the amount of correlation, which is proposed in this embodiment, by shifting the two-dimensional image is assumed to be nj=4. Furthermore, the number nj of lines (an odd number) may be changed in accordance with the brightness of the image of the subject, the image height of the image of the subject, the optical state of the shooting lens or the structure of the focus detection sensor. Since line 1 is an image having a pitch of two pixels, a point where the amount of correlation is minimized appears whenever the image is shifted by two pixels with respect to a true image shift amount 170 (=1 bit), as indicated at 173 in FIG. 13. The correlation amount 173 in FIG. 13 becomes zero even at the −1 location. As a result, with regard to line 1, the defocus amount is calculated upon determining that either the 1-bit-position or the −1-bit-position is the in-focus position.

Since line 3 is an image having a pitch of four pixels, a point where the amount of correlation is minimized appears whenever the image is shifted by four pixels. Therefore, in the range of the image shift amount (=±2 bits) shown in FIG. 13, the amount of correlation is minimized only at the location of true image shift amount 170 (=1 bit).

The situation regarding lines 1 and 3 has been described in FIG. 13. With regard to other lines, a point at which the amount of correlation is minimized appears at the pitch of repetition and there is a possibility that this will be determined as a false in-focus position.

For example, in a case where a false image shift amount (−1 bit) is erroneously selected from among points indicating two minima of the signal 173 of line 1, the 0 bit will be decided upon as the defocus amount if the focus measurement values of line 3 are simply averaged. As a result, there is a possibility that a problem will arise such as an in-focus determination despite the fact the image is actually not in focus.

On the other hand, with regard to the correlation amount 172 of the summed image and the correlation amount 171 of this embodiment, these have a steep bottom at the true image shift amount 170. If the vertical axis is observed, it will be understood that the S/N ratio is improved because the image shift amount at which the correlation amount is minimized and the correlation amounts at the other locations differ greatly owing to addition and the method of this embodiment. Further, it will be understood that a better S/N ratio is obtained with the correlation amount of this information than with the summed image.

In a manner similar to that of FIG. 12, FIG. 14 illustrates A and B images of 11×4 pixels and their summed images. In the image of FIG. 14, line 1 and line 2 of the B image have been shifted one bit to the left with respect to the A image, and line 3 and line 4 of the B image have been shifted one bit to the right with respect to the A image.

This corresponds to a condition in which a subject image that appears on lines 1, 2 is different from a subject image that appears on lines 3, 4. For example, there is a case where a short-distance subject appears on lines 1, 2 and the background appears on lines 3, 4. A case where a short-distance subject that appears on lines 1 and line 2 is brighter, as illustrated in FIG. 14, will be described.

Shown FIG. 15 are a correlation amount 181 calculated using Equation (2) proposed in this embodiment, a correlation amount 182 calculated using Equation (1) with respect to summed images, a correlation amount 183 calculated using Equation (1) with respect to line 1, and a correlation amount 184 calculated using Equation (1) with respect to line 3. It should be noted that the number of lines for obtaining the amount of correlation proposed in this embodiment is assumed to be nj=4.

Since line 1 and line 2 in the B image have been shifted one bit to the left with respect to the A image, the minimum value 180c of the amount of correlation of line 1 is −1 bit. On the other hand, since line 3 and line 4 in the B image have been shifted one bit to the right with respect to the A image, the minimum value 180a of the amount of correlation of line 3 is +1 bit. The degree of agreement of either image is high. Therefore, in a case where the measurement values are added and averaged as data having a high reliability, the position of the 0 bit is determined as the in-focus position. As a result, neither a subject at a short distance nor the background will be in focus.

On the other hand, the minimum value 180b of the correlation amount of the summed image indicates the 0 bit. As a result, if the defocus amount is found by performing a correlation calculation using the summed image, there is the danger that a location which is neither the position 180c where a subject at a short distance is in focus nor the position 180a where the background is in focus will be determined as the in-focus position. In the case where the position 180b is determined as the in-focus position, neither the subject at short distance nor the background will be in focus.

On the other hand, the minimum value of the correlation amount indicated in this embodiment has a bottom with respect to the subject 180c at short distance. Whether the subject selected is the short-distance subject or the background is decided automatically from the subject image signal included on the line to be added. Either the short-distance subject or the background will be brought into focus and it is possible to prevent a situation in which neither of these is brought into focus.

In accordance with this embodiment, the S/N ratio of the focus detection calculation is improved and focus detection in a state of low brightness can be performed appropriately in a focus detection apparatus that obtains a single focus measurement value from a plurality of pairs of focus detection images. Further, the appropriate subject is selected as the focus-measurement target even in an environment having a mixture of subjects at long and short distances.

Second Embodiment

Figure 16:
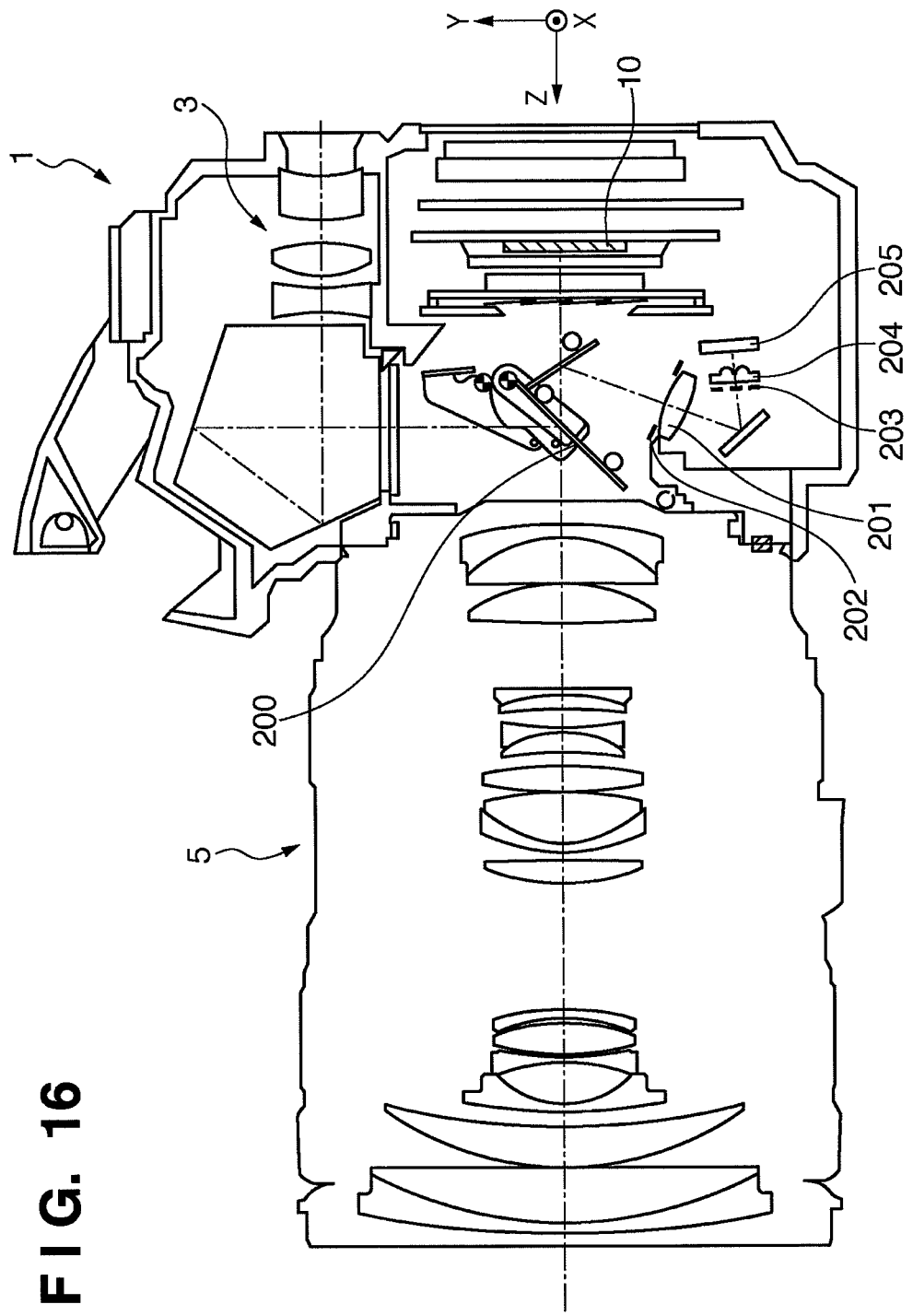
FIG. 16 is a diagram showing the structure of a camera according to a second embodiment of the present invention.
Figure 17:
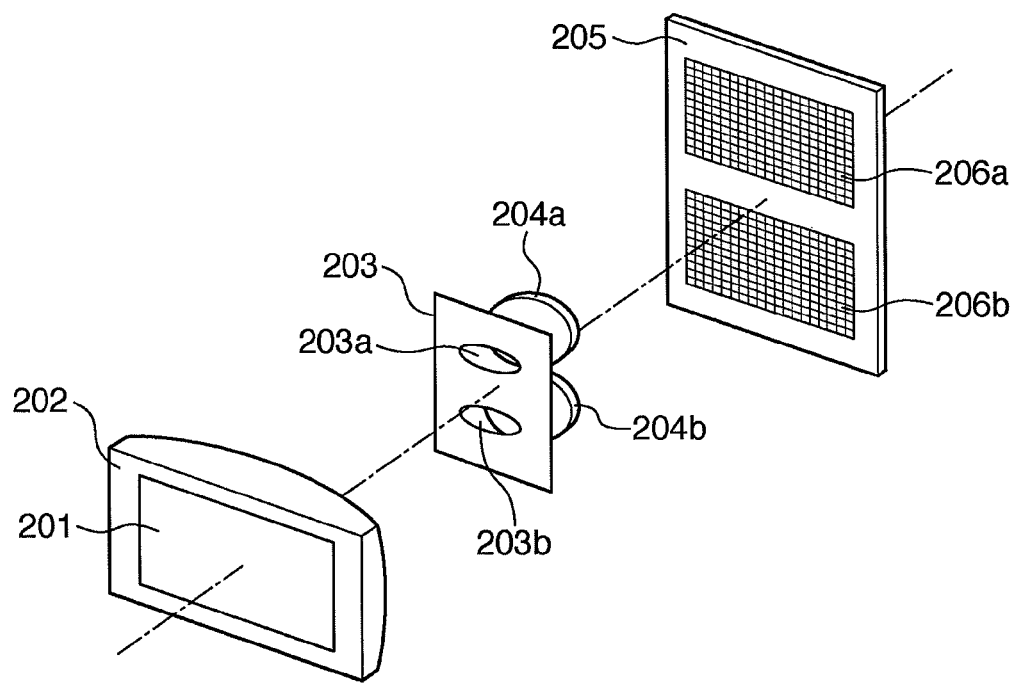
FIG. 17 is a diagram illustrating the configuration of a pupil dividing member.

FIGS. 16 and 17 are diagrams useful in describing a second embodiment of the present invention and reference will be had to these drawings to describe the first embodiment.

FIG. 16 is a sectional view of a camera equipped with a focus detection apparatus according to this embodiment. As shown in FIG. 16, an image sensor (solid-state image sensing device) 10 is disposed in the image plane of a shooting lens (photographic optical system) 5 of a digital still camera 1. The electrical configuration of the processing circuitry, etc., is similar to that of the first embodiment and need not be described again.

When the operator has decided the composition of the photograph using the apparatus shown in FIG. 16, the optical path is changed by a quick-return mirror 200 and light is introduced to the eyepiece lens 3 for observing the image of the subject. At the same time, the quick-return mirror 200 becomes a half-reflector and the remaining light is introduced to a focus detection sensor 205.

Pupil dividing means will be described with reference to FIGS. 16 and 17.

Shown in FIGS. 16 and 17 are a field lens 201, a visual-field mask 202, a pupil dividing mask 203, secondary image-forming lenses 204a, 204b, and a focus detection sensor 205. The visual-field mask 202 is provided in the neighborhood of the image plane of shooting lens 5 and regulates the focus detection region. The pupil dividing mask 203, which has diaphragm apertures 203a, 203b, is provided on the side near the shooting lens 5 as seen from the secondary image-forming lenses 204a, 204b. The diaphragm apertures 203a, 203b regulate the light that impinges upon the secondary image-forming lenses 204a, 204b. The pupil dividing mask 203 is situated in such a manner that an image will be formed by the power of the field lens 201 at a position that is conjugate with the emission pupil of the shooting lens 5.

The pair of secondary image-forming lenses 204a, 204b form images of a subject, which is in a region decided by the visual-field mask 202, on a pair of light-receiving areas 206a, 206b of the focus detection sensor 205. Subject image signals on the pair of light-receiving areas 206a, 206b of focus detection sensor 205 are read out as electric signals and are used in focus detection calculation. By calculating the appropriate positions of the signals obtained from the pair of light-receiving areas 206a, 206b, a defocus amount corresponding to the ranging visual field can be obtained.

Figure 18:
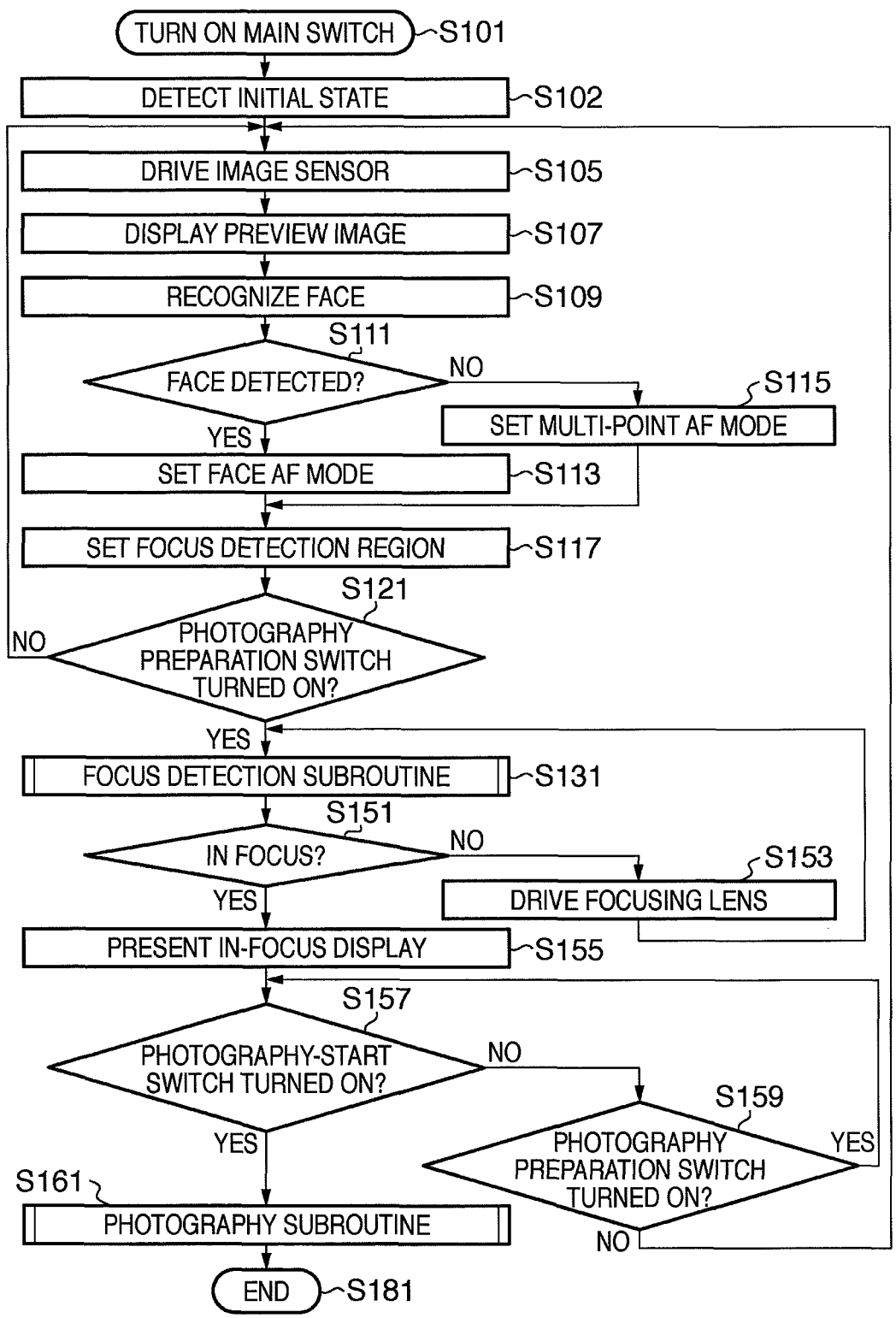
FIG. 18 is a main flowchart illustrating the operation of a digital still camera according to the second embodiment.

A flowchart of the focus detection operation is illustrated in FIG. 18. The focus detection subroutine and photography subroutine are executed in accordance with the flowcharts of FIGS. 10 and 11 illustrated in the first embodiment.

Steps in the flowchart of FIG. 18 identical with those of the first embodiment are identified by like step numbers. How this embodiment differs from the first embodiment will be described below.

This embodiment differs from the first embodiment in thin steps S103 and S104 are omitted. This embodiment requires a mirror-up operation and a shutter-release operation in order to introduce light to a so-called secondary image-forming optical system via the semitransparent quick-return mirror. In step S163 in the photography subroutine of the first embodiment, operation is such that the shutter is closed and then made to travel again. In this embodiment, however, the shutter is in the closed state when step S163 arrives and therefore it will suffice to perform a shutter-travel operation similar to that of the conventional emulsion camera. Other aspects of operation are similar to those of the first embodiment.

As shown in FIG. 17, the focus detection sensor 205 illustrated in this embodiment is a so-called "area sensor" in which the light-receiving area is broadened two-dimensionally. The present invention can readily be applied to such a sensor.

More specifically, the signal from the focus detection sensor 205 is read out in step S133 in FIG. 10. After the signal level is calculated in step S135, the appropriate positions and the number of image pairs are decided. This corresponds to cutting out images, which are used in the correlation calculation, two-dimensionally from the focus detection sensor 205. Operation from this point onward is similar to that of the first embodiment.

In accordance with this embodiment, the S/N ratio of the focus detection calculation is improved and focus detection in a state of low brightness can be performed appropriately in a focus detection apparatus that obtains a single focus measurement value from a plurality of pairs of focus detection images. In addition, the appropriate focus-measurement point is selected even in an environment having a mixture of subjects at long and short distances.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-264628, filed Oct. 10, 2008, which is hereby incorporated by reference herein in entirety.

The invention claimed is:

1. An image capturing apparatus comprising:
   a pupil dividing member which forms images of a pair of light beams that have passed through different pupil regions of a photographing optical system for forming the image of a subject;
   a focus detection sensor having a plurality of pixel portions arranged two-dimensionally, said pixel portions photo-electrically converting the images that have passed through said pupil dividing member and that are arranged in a pupil dividing direction along said focus detection sensor, and outputting image signals; and
   a focus detection unit which calculates correlation between a pair of images which are based upon signals output from said focus detection sensor, wherein said focus detection unit detects an in-focus position from a result of the calculation of correlation, and
   wherein each one of the pair of images is based upon image signals that include an image signal in a direction that is perpendicular to the pupil dividing direction.

2. The apparatus according to claim 1, wherein said focus detection sensor is arranged on an image plane of an image sensor.

3. The apparatus according to claim 1, wherein a plurality of image pairs in the direction that is perpendicular to the pupil dividing direction used in the calculation of amount of correlation are changed in accordance with brightness of the subject.

4. The apparatus according to claim 1, wherein a plurality of image pairs in the direction that is perpendicular to the pupil dividing direction used in the calculation of amount of correlation are changed in accordance with image height of the subject.

5. The apparatus according to claim 1, wherein a plurality of image pairs in the direction that is perpendicular to the pupil dividing direction used in the calculation of amount of correlation are changed in accordance with an optical state of the photographing optical system.

6. The apparatus according to claim 1, wherein a plurality of image pairs in the direction that is perpendicular to the pupil dividing direction used in the calculation of amount of correlation are changed in accordance with the structure of the focus detection sensor.

7. A method of controlling an image capturing apparatus having a pupil dividing member which forms images of a pair of light beams that have passed through different pupil regions of a photographing optical system for forming the image of a subject, and a focus detection sensor having a plurality of pixel portions arranged two-dimensionally, the pixel portions photoelectrically converting the images that have passed through the pupil dividing member and that are arranged in a pupil dividing direction along said focus detection sensor, and outputting image signals, said method comprising:
 a calculating step of calculating correlation between a pair of images which are based upon signals output from the focus detection sensor; and
 a detecting step of detecting an in-focus position from a result of the calculation of correlation,
 wherein each one of the pair of images is based upon image signals that include an image signal in a direction that is perpendicular to the pupil dividing direction.

8. A non-transitory computer readable medium storing a program for causing a computer to execute the control method set forth in claim 7.

* * * * *